(12) United States Patent
Sawyers et al.

(10) Patent No.: US 8,572,925 B2
(45) Date of Patent: *Nov. 5, 2013

(54) FRAME ASSEMBLY AND A METHOD OF MANUFACTURING THE SAME

(75) Inventors: Jeff V. Sawyers, Rice Lake, WI (US); Ron J. Pich, Cameron, WI (US)

(73) Assignee: Quanex Building Products Corporation, Houston, TX (US)

( * ) Notice: Subject to any disclaimer, the term of this patent is extended or adjusted under 35 U.S.C. 154(b) by 207 days.

This patent is subject to a terminal disclaimer.

(21) Appl. No.: 12/748,048

(22) Filed: Mar. 26, 2010

(65) Prior Publication Data

US 2010/0242400 A1   Sep. 30, 2010

Related U.S. Application Data

(60) Provisional application No. 61/211,205, filed on Mar. 27, 2009.

(51) Int. Cl.
*E04H 12/00* (2006.01)

(52) U.S. Cl.
USPC .......... 52/656.9; 52/658; 52/586.1; 52/655.1; 52/656.7; 403/401; 403/402; 403/292; 29/897.32

(58) Field of Classification Search
USPC ............... 52/656.9, 658, 656.7, 656.2, 585.1, 52/586.1, 586.2, 655.1; 403/381, 401, 403/402, 267, 292, 295; 16/225, 226, 227; 29/897.3, 897.32, 525.01
See application file for complete search history.

(56) References Cited

U.S. PATENT DOCUMENTS

| | | | |
|---|---|---|---|
| 1,908,270 A | 5/1933 | Shaffer | |
| 3,305,998 A | 2/1967 | Deisenroth | |
| 3,802,105 A | 4/1974 | Bendix | |
| 4,011,706 A * | 3/1977 | Dupree | 403/231 |
| 4,116,513 A * | 9/1978 | Ullman, Jr. | 312/348.2 |
| 4,222,209 A * | 9/1980 | Peterson | 52/172 |
| 4,357,744 A | 11/1982 | McKenzie et al. | |
| 4,383,781 A | 5/1983 | Alander | |
| 4,530,195 A * | 7/1985 | Leopold | 52/717.02 |
| 4,822,205 A * | 4/1989 | Berdan | 403/402 |
| 5,028,165 A | 7/1991 | Schools | |
| 5,048,997 A * | 9/1991 | Peterson | 403/295 |
| 5,154,531 A * | 10/1992 | Peterson | 403/205 |
| 5,231,862 A | 8/1993 | Ashley | |
| 5,351,451 A | 10/1994 | Misera et al. | |
| 5,473,853 A | 12/1995 | Guillemet et al. | |
| 5,881,525 A | 3/1999 | Riegelman et al. | |
| 6,038,825 A | 3/2000 | Shah et al. | |
| 6,390,173 B1 | 5/2002 | Story, Jr. | |
| 6,406,213 B1 | 6/2002 | Dohman et al. | |
| 6,643,988 B1 | 11/2003 | Armstrong et al. | |

(Continued)

*Primary Examiner* — Robert Canfield
*Assistant Examiner* — Matthew Gitlin
(74) *Attorney, Agent, or Firm* — Howard & Howard Attorneys PLLC

(57) ABSTRACT

A frame assembly supports an article. The frame assembly comprises a frame member having a plurality of walls extending between a first end and a second end. The walls define an interior of the frame member. The frame assembly also comprises at least one foldable cornerlock. The foldable cornerlock has first and second body portions movable relative to each other. A method of manufacturing the frame assembly comprises the steps of forming at least one notch in the frame member spaced from the ends of the frame member, inserting the foldable cornerlock into the notch, and bending the frame member about the notch of the frame member.

25 Claims, 8 Drawing Sheets

(56) References Cited

U.S. PATENT DOCUMENTS

| | | | |
|---|---|---|---|
| 6,672,365 B2 * | 1/2004 | Therrien | 160/369 |
| 6,678,934 B1 | 1/2004 | LaSusa | |
| 6,681,833 B2 | 1/2004 | Wylie | |
| 6,862,859 B2 * | 3/2005 | Kronenberg | 52/656.9 |
| 7,117,576 B2 | 10/2006 | LaSusa | |
| 7,418,806 B2 | 9/2008 | Martineau et al. | |
| 8,028,489 B1 * | 10/2011 | Lawrence | 52/656.7 |
| 8,240,940 B2 * | 8/2012 | Strohheker | 403/205 |
| 8,250,819 B2 * | 8/2012 | Subra | 52/172 |
| 2004/0088943 A1 * | 5/2004 | Kronenberg | 52/656.9 |
| 2008/0219759 A1 | 9/2008 | Therrien | |
| 2008/0263973 A1 * | 10/2008 | Lenhardt | 52/204.591 |

* cited by examiner

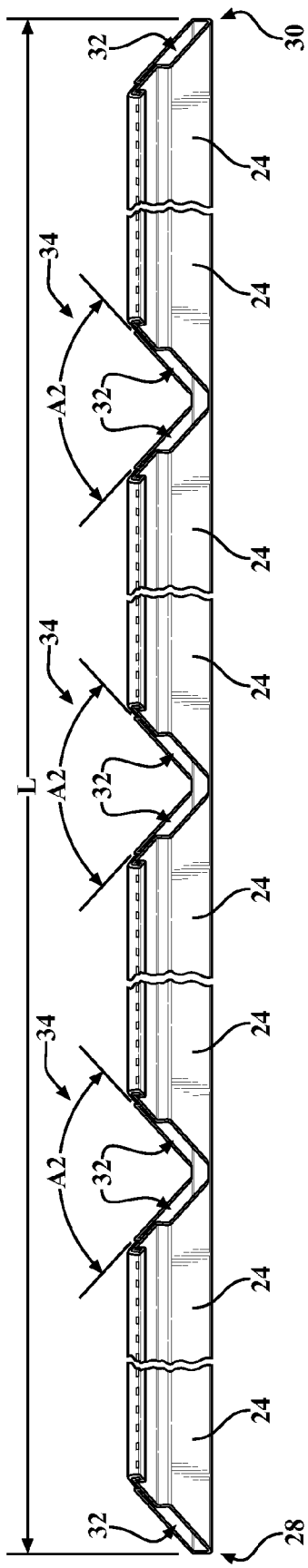
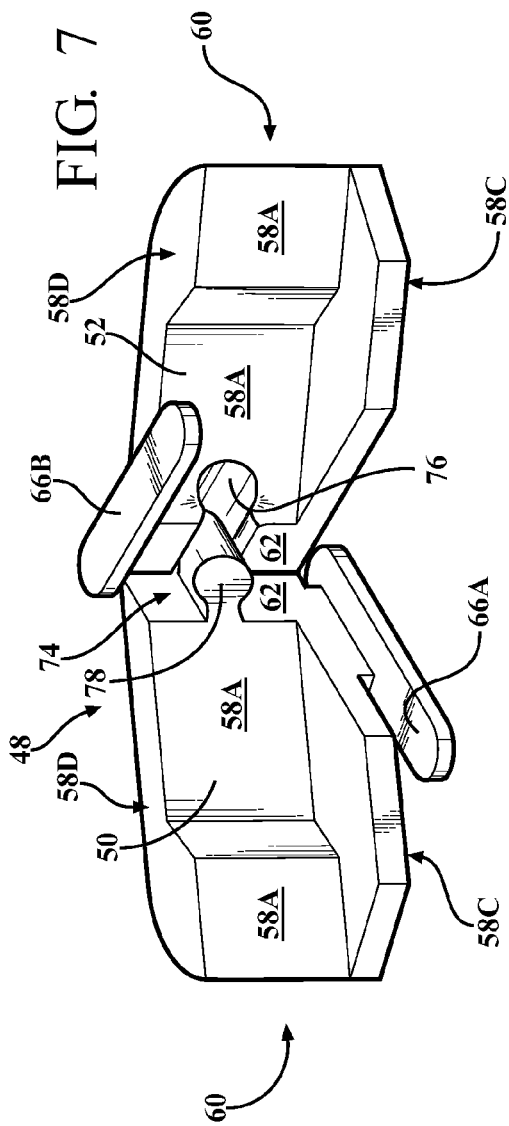
FIG. 2
FIG. 7

FRAME ASSEMBLY AND A METHOD OF MANUFACTURING THE SAME

CROSS REFERENCE TO RELATED APPLICATION

This application claims priority to and all the advantages of U.S. Provisional Patent Application No. 61/211,205 filed on Mar. 27, 2009, which is incorporated by reference.

BACKGROUND OF THE INVENTION

1. Field of the Invention

The invention generally relates to a frame assembly for receiving an article and to a method of manufacturing the frame assembly. More specifically, the invention relates to a foldable cornerlock for use in the frame assembly and the method of manufacturing the frame assembly.

2. Description of the Related Art

Frame assemblies for supporting an article are known in the art and have been widely used by window manufacturers. The article supported by the frame assembly may be a fenestration article, such as a screen cloth or pane of glass.

The frame assemblies include at least one frame member. The frame member has four walls presenting a rectangular cross-section of the frame member. The walls of the frame member impart the frame member with strength and rigidity. The frame member also has a first end and a second end spaced from the first end. The frame assemblies of the prior art are either a multiple frame member frame assembly or a single frame member frame assembly. A common multiple frame member frame assembly has four of the frame members. Four coupling cornerlocks are used to secure the frame members together to present a rectangular configuration. During manufacturing of the multiple frame member frame assembly, each of the frame members must be individually produced. More specifically, each of the frame members must be cut to a desired length.

The single frame member frame assembly includes only one frame member with the walls of the frame member defining three notches. The frame member is bent at the notches to present a rectangular configuration of the frame member and results in the ends of the frame member being adjacent each other. The ends of the frame member are secured together with one of the coupling cornerlocks. A bracket is mounted to an exterior of the frame member at each of the corners for reinforcing the frame member at the corners. The inclusion of the bracket requires additional time and increases the cost to manufacture the single frame member frame assembly. Additionally, because the bracket is coupled to the exterior of the frame member, the bracket results in an appearance of the exterior of the frame member that is aesthetically unpleasing.

Therefore, there remains a need to provide an improved frame assembly and method of manufacturing the frame assembly.

SUMMARY OF THE INVENTION AND ADVANTAGES

A frame assembly supports an article. The frame assembly comprises a frame member. The frame member has a plurality of walls extending between a first end and a second end, which is spaced from the first end. The walls define an interior of the frame member. The frame assembly also comprises at least one foldable cornerlock. The foldable cornerlock has first and second body portions movable relative to each other. A method of manufacturing the frame assembly comprises the steps of forming at least one notch in the frame member spaced from the ends of the frame member and inserting the foldable cornerlock into the notch such that the body portions of the foldable cornerlock extend into the interior of the frame member. The method also comprises the step of bending the frame member about the notch to define a corner of the frame member.

Inserting the foldable cornerlock into the notch reinforces the frame member at notch. Additionally, an appearance of an exterior the frame member can be unaffected by the inclusion of the foldable cornerlock in the frame assembly because the body portions of the foldable cornerlock extend into the interior of the frame member and are not coupled to the exterior of the frame member.

BRIEF DESCRIPTION OF THE DRAWINGS

Other advantages of the present invention will be readily appreciated, as the same becomes better understood by reference to the following detailed description, when considered in connection with the accompanying drawings wherein:

FIG. 2 is a perspective view of the frame member illustrating walls of the frame member defining three notches;

FIG. 7 is another perspective view of the foldable cornerlock;

DETAILED DESCRIPTION OF THE EXEMPLARY EMBODIMENT

Referring to the Figures, wherein like numerals indicate corresponding parts throughout the several views, a frame assembly 20 is generally shown. Although not required, the frame assembly 20 is typically coupled to a structure, such as a building or a house as part of a window or door assembly. It is to be appreciated that the frame assembly 20 may be disposed within an interior of the structure or an exterior of the structure. A method of manufacturing the frame assembly 20 is disclosed herein.

Figure 1:
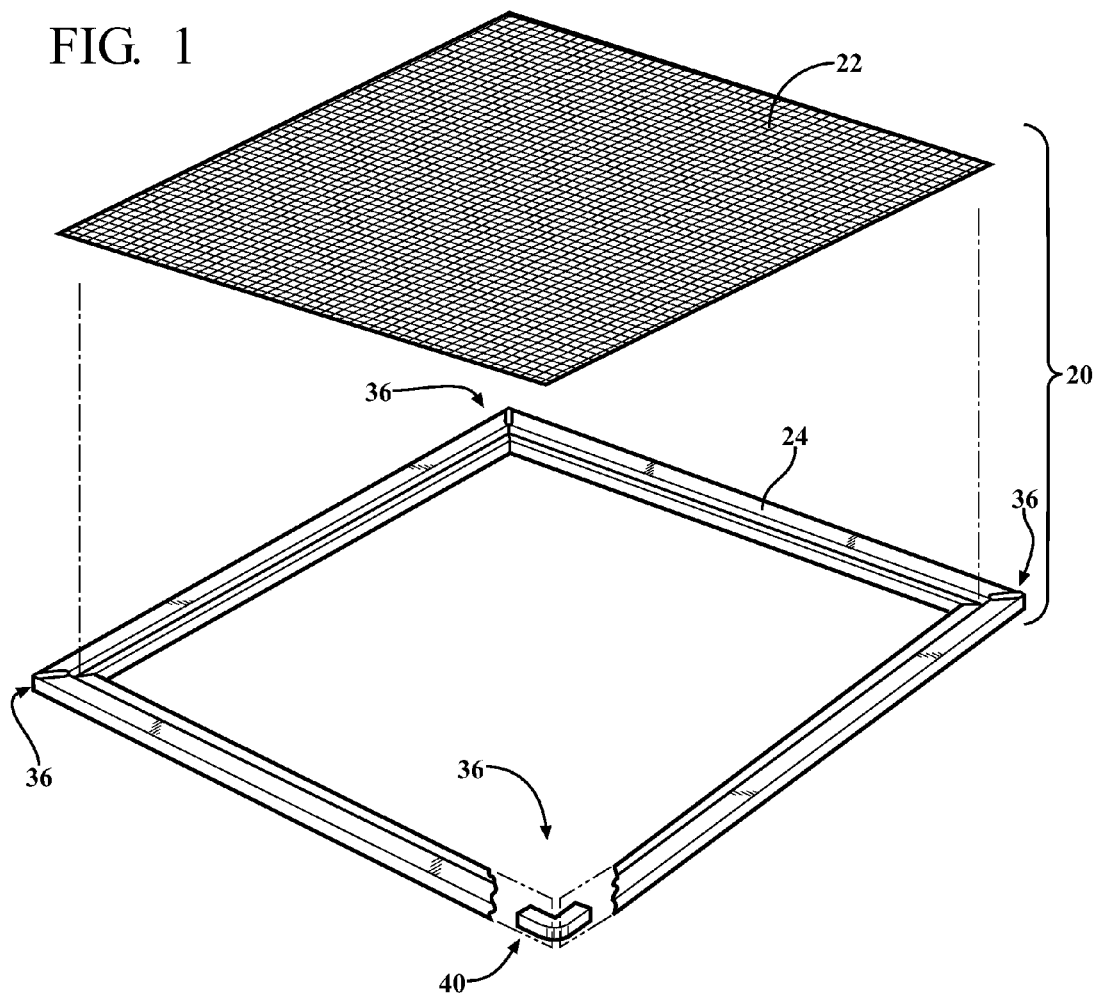
FIG. 1 is a perspective view of a frame assembly having an article spaced from a frame member.

With reference to FIG. 1, the frame assembly 20 has a perimeter presenting a rectangular configuration. It is to be appreciated that the frame assembly 20 may present other configurations such as a triangular configuration, or a pentagonal configuration. The frame assembly 20 may comprise an article 22, with the frame assembly 20 supporting the article 22. The article 22 is attached to the frame member 24. It is to be appreciated that the article 22 may be a fenestration article, such as a screen cloth as shown in FIG. 1, a glass pane, or a plastic panel with the fenestration article coupled to the frame assembly 20. Alternatively, the article 22 may be a picture, or a painting. However, it should be understood that the frame assembly 20 may support any desired article.

The frame assembly 20 comprises a frame member 24. It is to be appreciated that the frame member 24 may be made from any suitable material, such as metal, and/or plastic. It is also to be appreciated that the frame member 24 may be formed by any suitable process including, but not limited to molding, roll forming, and/or extruding. With reference to FIG. 2, the frame member 24 has an entire length L which is typically equal to the perimeter of the frame assembly 20 such that there is only one frame member 24. However, it is to be appreciated that the frame assembly 20 may comprise more than one frame member 24. The frame member 24 has a plurality of walls 26A-26D extending between a first end 28 and a second end 30 spaced from said first end 28. The walls 26A-26D impart strength and rigidity to the frame member. The walls 26A-26D define an interior 32 of the frame member 24. Although not required, the interior 32 of the frame member 24 may be hollow. However, it is to be appreciated that the frame member 24 does not have to be completely hollow and can be formed as a solid component with hollowed out portions.

Figure 3:
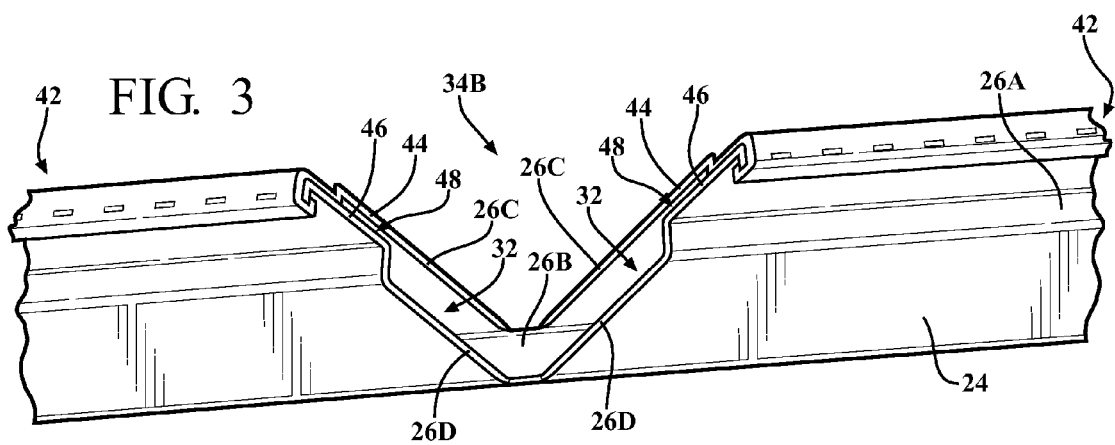
FIG. 3 is an enlarged perspective view of a portion of the frame member of FIG. 2 illustrating the walls of the frame member defining one notch.

With reference to FIGS. 2 and 3, in one embodiment, the frame member 24 has a rectangular cross-section. In such an embodiment, the plurality of walls 26A-26D are further defined as a top wall 26A, a bottom wall 26B spaced opposite from the top wall 26A, an exterior wall 26C interconnecting the top wall 26A and the bottom wall 26B, and an interior wall 26D spaced opposite from the exterior wall 26C and interconnecting the top wall 26A and the bottom wall 26B. It is to be appreciated that the frame member 24 may have other cross-sections, such as a triangular cross-section. When the frame assembly is coupled to the structure the interior wall 26D faces the interior of the structure and the exterior wall 26C faces the exterior of the structure.

The method comprises the steps of forming at least one notch 34A-34C in the frame member 24 spaced from the ends 28, 30 of the frame member 24. The walls 26A-26D of the frame member 24 define the notch 34A-34C. At least one of the walls 26A-26D is continuous over the entire length L of the frame member 24. For example, the notch 34A-34C extends through the top wall 26A, the exterior wall 26C and the interior wall 26D such that the bottom wall 26B is continuous over the entire length L of the frame member 24. It is to be appreciated that the notch 34A-34C may be formed in the frame member 24 by any suitable method, such as cutting, and/or stamping.

The frame member 24 is bendable at the notch 34A-34C to form a corner 36 of the frame member 24. The method includes the step of bending the frame member 24 about the notch 34A-34C to define a corner 36 of the frame member 24. The formation of the notch 34A-34C in the frame member 24 weakens the frame member 24 at the notch 34A-34C. Said differently, the notch 34A-34C results in an absence of a portion of the walls 26A-26D of the frame member 24 which reduces the strength and rigidity of the frame member 24 at the notch 34A-34C. The weakening of the frame member 24 at the notch 34A-34C allows the frame member 24 to be bent at the notch 34A-34C. The bending of the frame member 24 at the notch 34A-34C brings the walls 26A-26D of the frame member 24 on either side of the notch 34A-34C together. However, the walls 26A-26D on either side of the notch 34A-34C generally do not contact each other thereby defining a groove between the walls 26A-26D of the frame assembly 20 on either side of the notch 34A-34C after the frame member 24 is bent.

Figure 13:
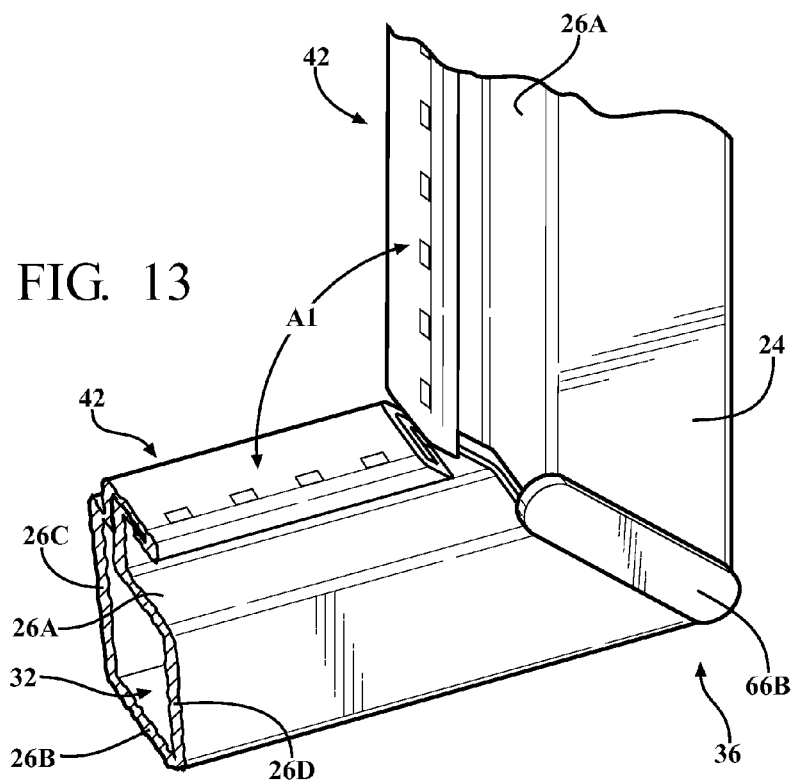
FIG. 13 is a perspective view of a portion of the frame member when the frame member is bent to form a corner of the frame member with the foldable cornerlock inserted within the notch of the frame member.

Bending the frame member 24 at the notch 34A-34C establishes a first angle A1 as shown in FIG. 13. For example, if the frame member 24 is to have the rectangular configuration, then the first angle A1 of the frame member 24 is approximately 90 degrees. Typically, the notch 34A-34C presents a general V-shape configuration defining a second angle A2. However, it is to be appreciated that the notch 34A-34C can present other configurations, such as a U-shaped configuration. Generally, the second angle A2 is equal to the first angle A1 defined by the frame member 24.

In one embodiment, the at least one notch 34A-34C may be further defined as a first notch 34A, a second notch 34B, and a third notch 34C with each of the notches 34A, 34B, 34C spaced from each other and from the ends 28, 30 of the frame member 24, as shown in FIG. 2. It is to be appreciated that each of the first notch 34A, the second notch 34B, and the third notch 34C are defined by the walls 26A-26D of the frame member 24. As such, it is to be appreciated that the step of forming at least one notch 34A-34C in the frame member 24 may be further defined as forming the first notch 34A, the second notch 34B, and the third notch 34C in the frame member 24 with each of the notches 34A-34C spaced from each other and from the ends 28, 30 of the frame member 24. If the first notch 34A, the second notch 34B, and the third notch 34C are present, then the frame member 24 is bent about the first notch 34A, the second notch 34B, and the third notch 34C to present the frame assembly 20 with a rectangular configuration. However, it should be appreciated that the number of notches 34A-34C defined by the frame member 24 may be changed resulting in the frame member 24 presenting other configurations such as the triangular or pentagonal configurations as described above.

The method may also comprise the step of coupling the ends 28, 30 of the frame member 24 together with the coupling cornerlock 40. The coupling cornerlock 40 is included in the frame assembly 20 and is disposed in each of the ends 28, 30 of the frame member 24 for coupling the ends 28, 30 of the frame member 24 together. It is to be appreciated that the ends 28, 30 of the frame member 24 may be coupled together by any suitable method and/or device. For example, a fixed or bendable cornerlock may be used to couple the ends 28, 30. Bending the frame member 24 about the first notch 34A, the second notch 34B, and the third notch 34C results in the ends 28, 30 of the frame member 24 being adjacent to each other such that the coupling cornerlock 40 can engage each of the ends 28, 30 for securing the ends 28, 30 together. If the coupling cornerlock 40 is utilized, then the ends 28, 30 of the frame member 24 may be cut at opposing angles for forming the corner 36 or, alternatively, the coupling cornerlock 40 may be the corner 36.

The frame assembly 20 may further comprise a flange 42 extending from the frame member 24 for securing the article 22 to the frame member 24. The flange 42 may be integral with the frame member 24 or, the flange 42 may be a discrete component coupled to the frame member 24. Additionally, if the flange 42 is present, then the interior 32 of the frame member 24 may be defined by the walls 26A-26D of the frame member and the flange 42. It is to be appreciated that the flange 42 is not required and the frame member 24 may support the article 22 by any suitable method.

The frame assembly 20 also comprises at least one foldable cornerlock 48. It is to be appreciated that the foldable cornerlock 48 may also be referred to as a foldable corner key. The foldable cornerlock 48 is described in co-pending U.S. patent application to Sawyers et al. filed on Mar. 26, 2010 entitled "Foldable Cornerlock for a Frame Assembly," which claims priority to U.S. Provisional Application No. 61/211,205, and is hereby incorporated by reference. The method comprises the step of inserting the foldable cornerlock 48 into the notch 34A-34C of the frame member 24. Generally, the foldable cornerlock 48 is inserted into the notch 34A-34C prior to bending the frame member 24 at the notch 34A-34C. The foldable cornerlock 48 is disposed in the notch 34A-34C of the frame member 24 and extends into the interior 32 of the frame member 24. Typically, the foldable cornerlock 48 is made from a rigid thermoplastic, but could be made from a metal. The foldable cornerlock 48 reinforces the frame member 24 at the notch 34A-34C. Said differently, the foldable cornerlock 48 imparts strength and rigidity to the frame member at the notch 34A-34C.

In one embodiment, the at least one foldable cornerlock 48 is further defined as a first foldable cornerlock 48A, a second foldable cornerlock 48B, and a third foldable cornerlock 48C disposed in the first notch 34A, the second notch 34B and the third notch 34C, respectively. In addition to being utilized in the notches 34A-34C, the foldable cornerlock 48 may also be used to couple the ends 28, 30 of the frame member 24 together. When there are three notches 34A-34C and three foldable cornerlocks 48A-48C, the first foldable cornerlock 48A is inserted into the first notch 34A, the second foldable cornerlock 48B is inserted into the second notch 34B, and the third foldable cornerlock 48C is inserted into the third notch 34C such that each of the foldable cornerlocks 48A-48C extend into the interior 32 of the frame member 24.

The foldable cornerlock 48 comprises first and second body portions 50, 52 movable relative to each other. The body portions 50, 52 of the foldable cornerlock 48 extend into the interior 32 of the frame member 24 when the foldable cornerlock 48 is inserted into the notch 34A-34C, The foldable cornerlock 48 may comprise a hinge portion 54 which couples the body portions 50, 52 together. The hinge portion 54 defines an axis 56 extending in a longitudinal direction through the hinge portion 54. If the hinge portion 54 is present, then the body portions 50, 52 may be rotatable about the axis 56 for inserting the foldable cornerlock 48 into the notch 34A-34C of the frame member 24. It is to be appreciated that the body portions 50, 52 are not required to rotate a full 360 degrees, any degree of rotation is sufficient. The body portions 50, 52 of the foldable cornerlock 48 may be ridge for imparting rigidity to the frame member 24 at the corner 36. Said differently, if the body portions 50, 52 are ridged then the body portions 50, 52 do not flex. The hinge portion 54 may be integral to the body portions 50, 52, such as a living hinge. Alternatively, the hinge portion 54 may be a discrete component to the body portions 50, 52 with the body portions 50, 52 mechanically coupled to the hinge portion 54.

The first and second body portions 50, 52 are each configured to mate with the interior 32 of the frame member 24 for preventing the foldable cornerlock 48 from shifting within the frame member 24. Said differently, each of the body portions 50, 52 of the foldable cornerlock 48 has a plurality of surfaces for contacting the walls 26A-26D of the frame member 24 within the interior 32 of the frame member 24. For example, if the frame member 24 includes the top wall 26A, the bottom wall 26B, the exterior wall 26C, and the interior wall 26D, then each of the body portions 50, 52 includes a top surface 58A for contacting the top wall 26A, an opposing bottom surface 58B for contacting the bottom wall 26B, an exterior surface 58C for contacting the exterior wall 26C and an opposing interior surface 58D for contacting the interior wall 26D. The exterior surface 58C and interior surfaces 58D may be transverse to the top surface 58A and bottom surfaces 58B. Additionally, if the flange 42 is present, then the exterior surface 58C may extend beyond the top surface 58A for engaging the interior 32 defined by the flange 42.

Each of the body portions 50, 52 have an end 60 spaced from the hinge portion 54. The bottom surface 58B extends from the hinge portion 54 to the end 60 of the body portions 50, 52. Additionally, each of the body portions 50, 52 may comprise an abutting surface 62 extending from the hinge portion 54 to the top surface 58A.

Figure 4:
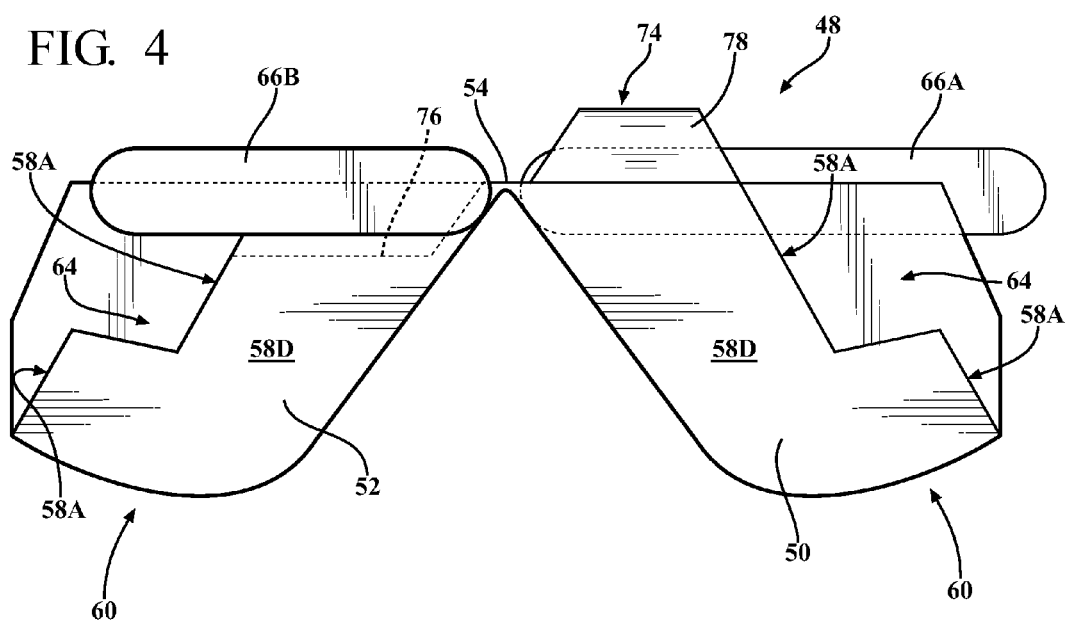
FIG. 4 is a front view of a foldable cornerlock having first and second body portions.
Figure 5:
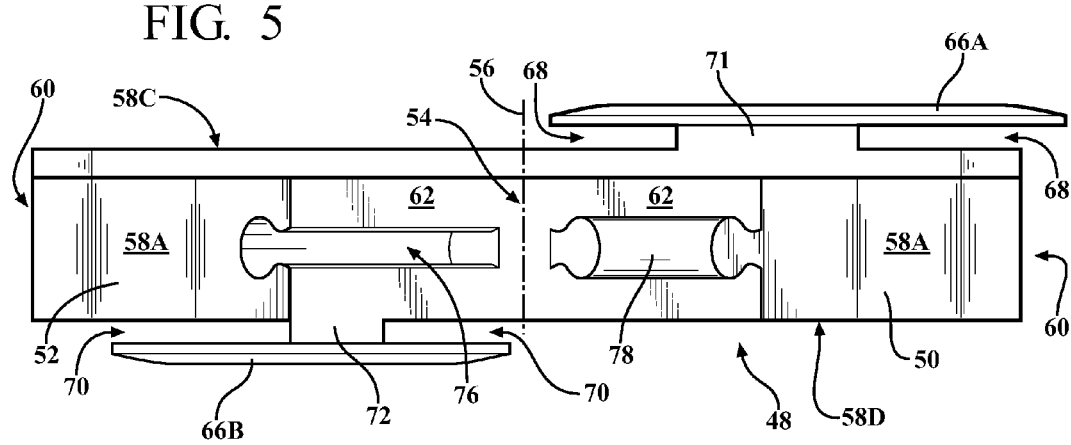
FIG. 5 is a top view of the foldable cornerlock of FIG. 4.
Figure 6:
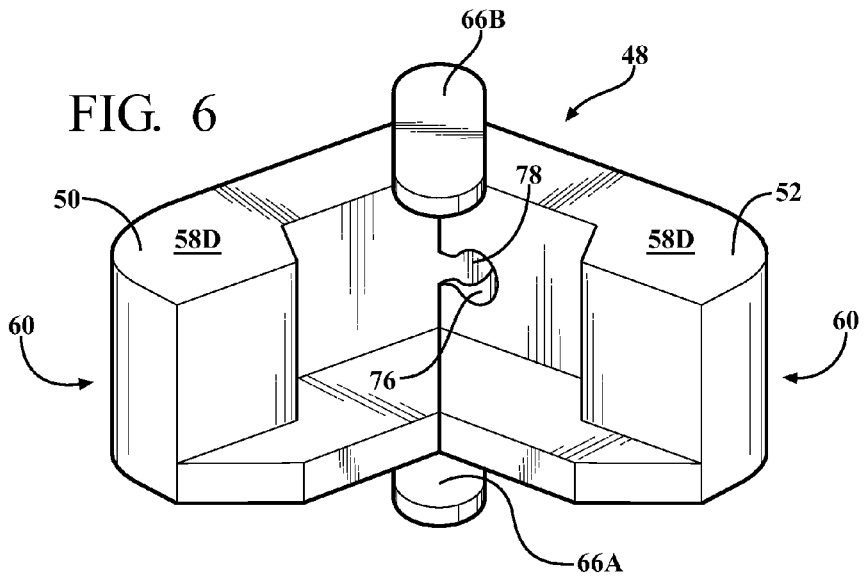
FIG. 6 is a perspective view of the foldable cornerlock with the body portioned in a locked position.
Figure 8:
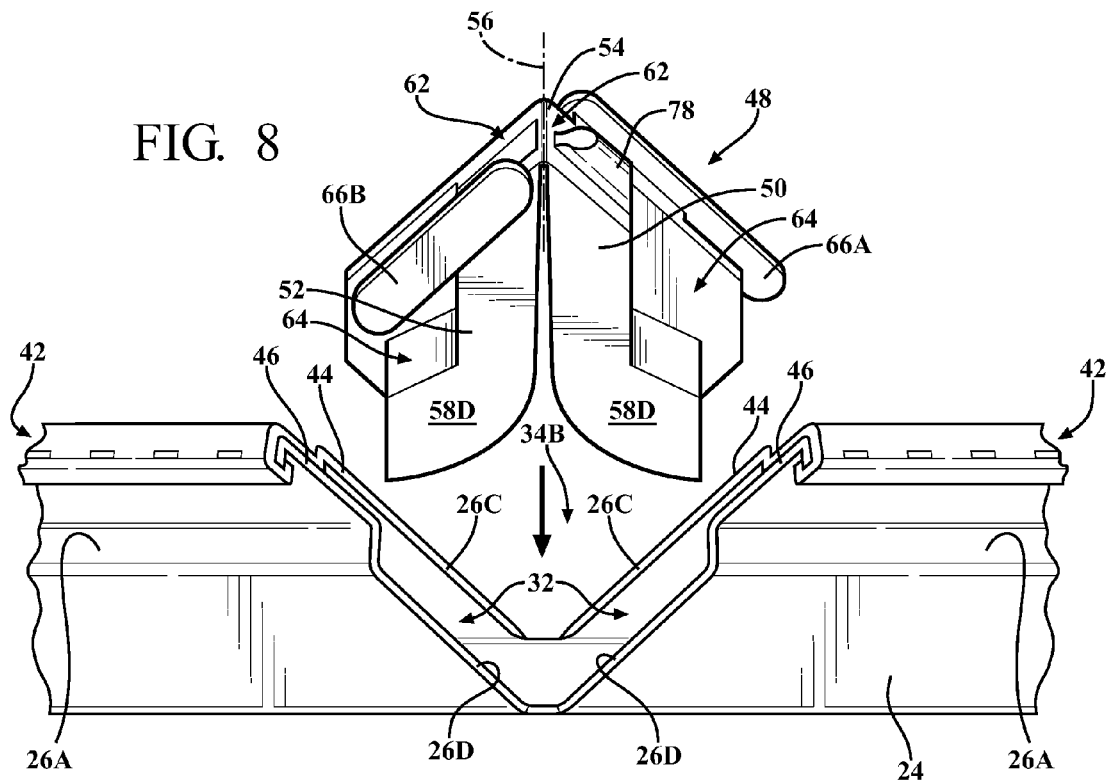
FIG. 8 is a perspective view of the foldable cornerlock spaced from the frame member with the body portions in a pre-inserted position.

With reference to FIG. 4, the end 60 of each of the body portions 50, 52 has an arcuate configuration for sliding along the interior 32 of the frame member 24 as the foldable cornerlock 48 is inserted in the notch 34A-34C. The arcuate configuration of the end 60 may continuously extend from the top surface 58A to the bottom surface 58B. Alternatively, only a portion of the end 60 may have the arcuate configuration.

Each of the body portions 50, 52 may define a recess 64 for allowing the body portions 50, 52 to be inserted into the notch 34A-34C of the frame member 24. Said differently, the recess 64 allows the body portions 50, 52 of the foldable cornerlock 48 to slide past the walls 26A-26D of the frame member 24 defining the notch 34A-34C. The top surface 58A of each of the body portions 50, 52 defines the recess 64.

Figure 10:
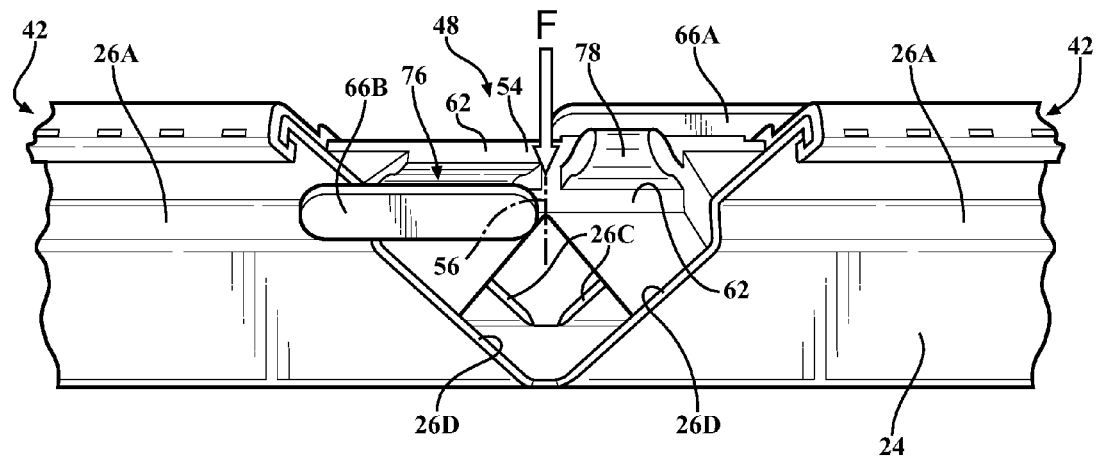
FIG. 10 is a perspective view of a portion of the frame member with the foldable cornerlock within the notch of the frame member.

The foldable cornerlock 48 may also comprise at least one arm member 66 spaced in the longitudinal direction from one of the first and second body portions 50, 52 thereby defining a gap 68. As illustrated in FIG. 10, the gap 68 receives one of the walls 26A-26D of the frame member 24 when the foldable cornerlock 36 is disposed within the notch 34A-34C. As the frame member 24 is bent, one of the walls 26A-26D of the frame member 24 is received in the gap 68. Referring to FIG. 13, the arm member 66A, 66B cover the groove defined by the walls 26A-26D of the frame member 24 at the corner 36 to provide an aesthetically pleasing appearance.

The at least one arm member 66 may be further defined as a first arm member 66A and a second arm member 66B. The first arm member 66A is spaced in the longitudinal direction from the first body portion 50 thereby defining a gap 68 for receiving one of the walls 26A-26D of the frame member 24, and the second arm member 66B spaced in the longitudinal direction from one of the first and second body portions 50, 52 thereby defining a second gap 70 for receiving one of the walls 26A-26D of the frame member 24. However, the foldable cornerlock 48 may include only one arm member 66. If the first and second arm members 66A, 66B are both present, then the arm members 66A, 66B are spaced from each other for allowing the frame member 24 to be disposed between the arm members 66A, 66B. Disposing the frame member 24 between the arm members 66A, 66B allows the arm members 66A, 66B to cover the walls 26A-26D of the frame member 24 at the corner 36. More specifically, the arm members 66A, 66B cover the groove to present an aesthetically pleasing appearance. Additionally, the arm members 66A, 66B may impart additional strength and rigidity to the frame member 24 at the corner 36. The first arm member 66A is spaced in the longitudinal direction from the exterior surface 58C of the body portions 50, 52 and the second arm member 66B is spaced in the longitudinal direction from the interior surface 58D of the body portions 50, 52.

The foldable cornerlock 48 may further comprise a first post 71 extending from the first body portion 50 to the first arm member 66A for coupling the first arm member 66A to the first body portion 50. If the second arm member 66B is present, then the foldable cornerlock 48 also includes a second post 72 extending from the second body portion 52 to the second arm member 66B for coupling the second arm member 66B to the second body portion 52. The first post 71 extends from the exterior surface 58C of the first body portion 50 and the second post 72 extends from the interior surface 58D of the second body portion 52.

The foldable cornerlock 48 may comprise interlocking portions 74 configured to engage each other for securing the body portions 50, 52 together. The interlocking portions 74 reinforce the frame member 24 at the corner 36 because the interlocking portions 74 prevent the body portions 50, 52 from moving relative to each other which facilitates resistance of torsional forces that may act on the frame member 26. The interlocking portions 74 may comprise a female portion 76 defined by the first body portion 50 and a male portion 78 extending from the second body portion 52 configured to mate with the female portion 76. The abutting surface 62 of the first body portion 50 defines the female portion 76 and the male portion 78 extends from the abutting surface 62 of the second body portion 52. Alternatively, the female portion 76 may be defined by the second body portion 52 and the male portion 78 may extend from the first body portion 50.

As described above, the body portions 50, 52 of the foldable cornerlock 48 are movable relative to each other. With reference to FIGS. 8-13, the body portions 50, 52 may move between a pre-inserted position, an inserted position, and a locked position. Although the pre-inserted position, inserted position, and the locked position have been described with the body portions 50, 52 moving relative to each other, it is to be appreciated that the movement may be rotation, with the body portions 50, 52 rotating about the axis 56. Additionally, the body portions 50, 52 may move in other ways, such as laterally. The foldable cornerlock 48 may be positioned within the notch 34A-34C with the body portions 50, 52 in the pre-inserted position such that the hinge portion 54 is spaced from the frame member 24.

Figure 9:
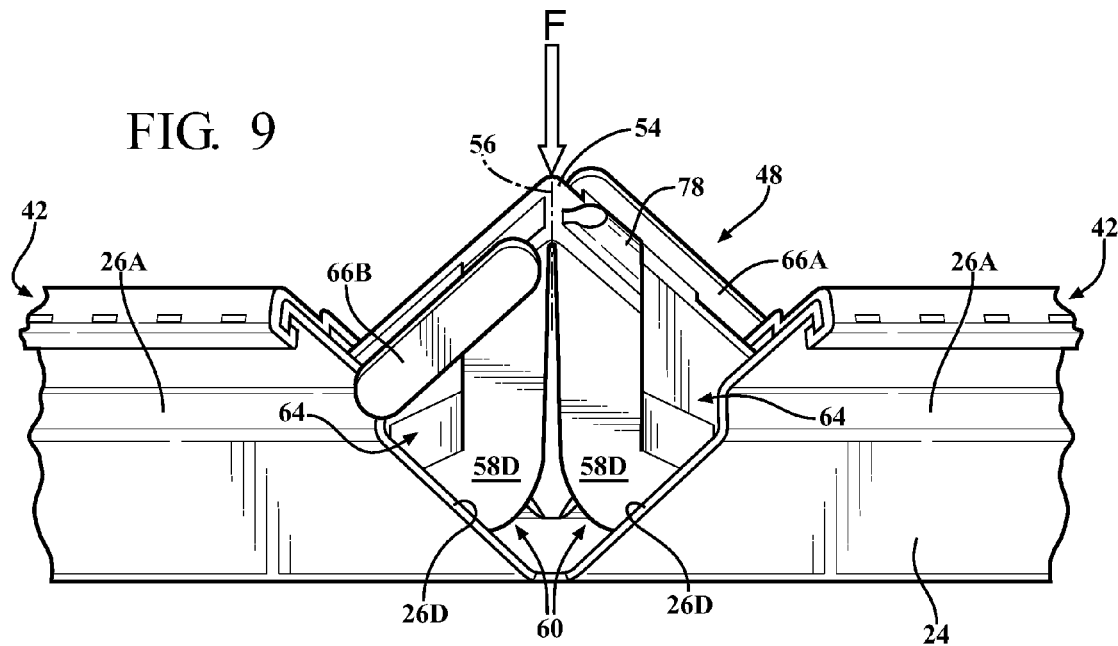
FIG. 9 is a perspective view of a portion of the frame member with the foldable cornerlock within the notch of the frame member and the body portions of the foldable cornerlock in the pre-inserted position.
Figure 9A:
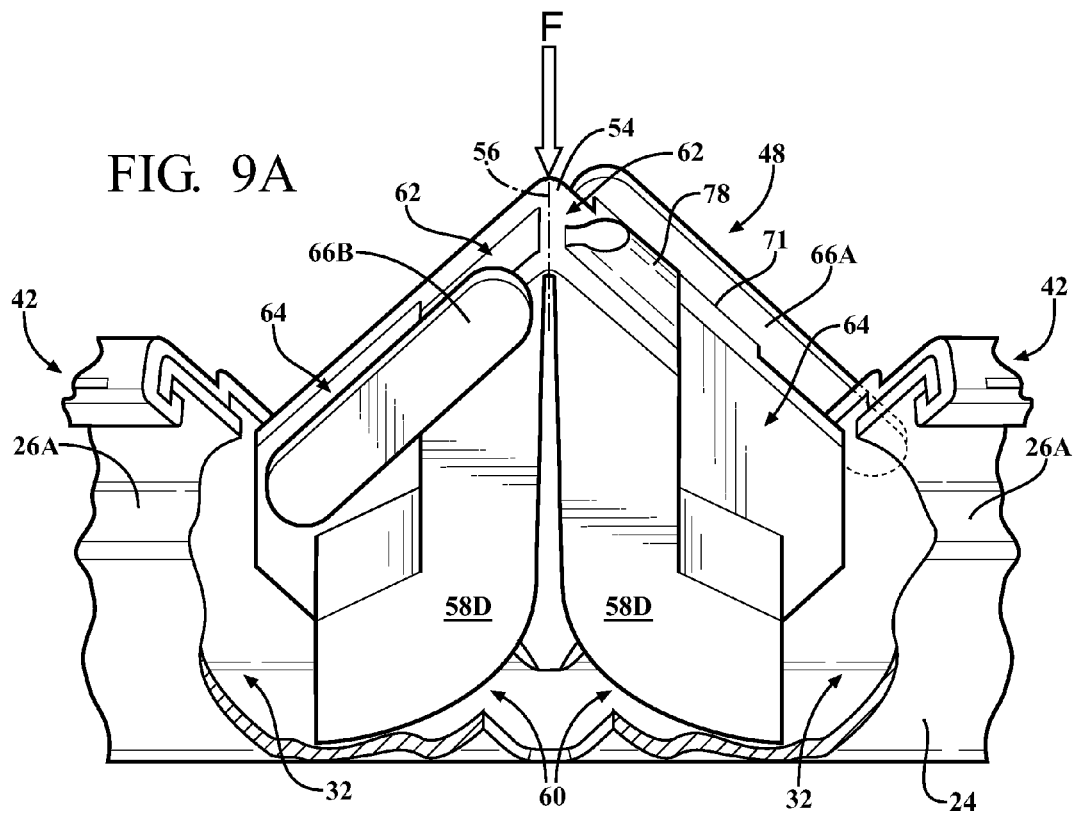
FIG. 9A is the perspective view of FIG. 9 with the frame member partial cut away to reveal the cornerlock within an interior of the frame member.

As shown in FIGS. 9 and 9A, when the body portions 50, 52 are in the pre-inserted position, the body portions 50, 52 establish an acute angle relative to each other. More specifically, when the body portions 50, 52 are in the pre-inserted position, the bottom surface 26B of each of the body portions 50, 52 establishes the acute angle relative to each other.

Figure 10A:
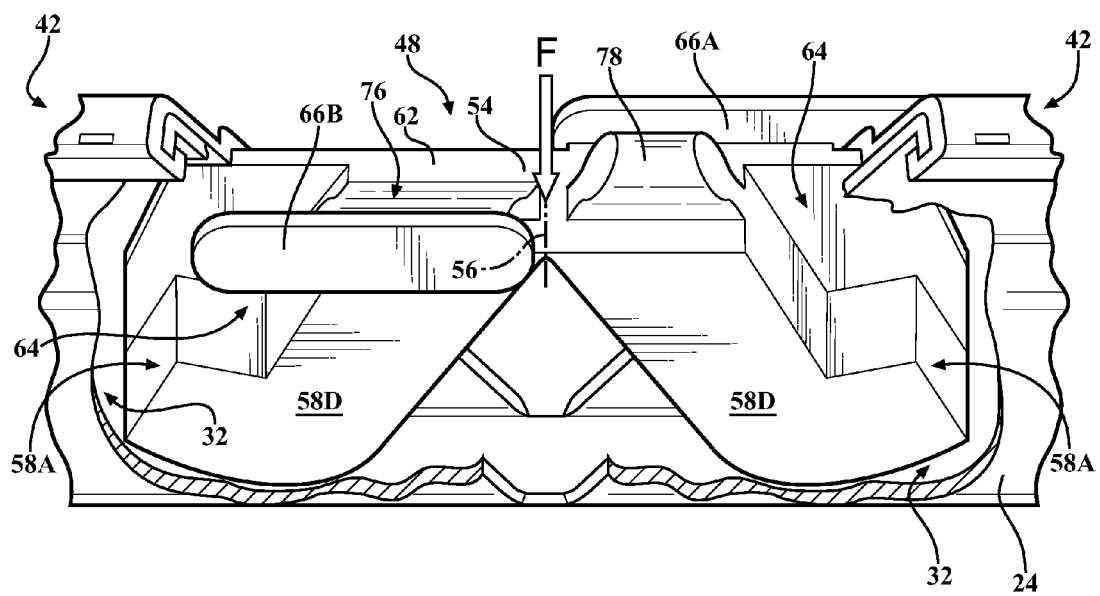
FIG. 10A is the perspective view of FIG. 10 with the frame member partial cut away to reveal the cornerlock within the interior of the frame member.
Figure 11:
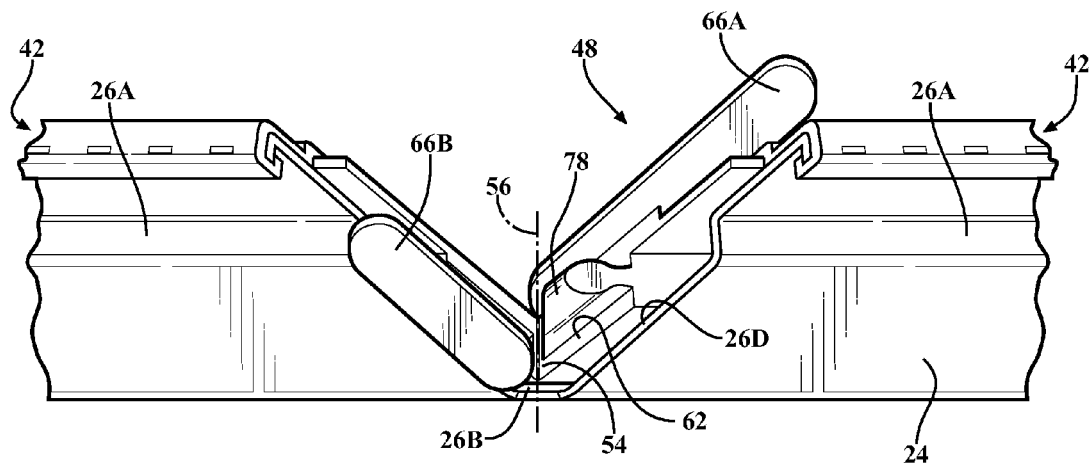
FIG. 11 is a perspective view of a portion of the frame member with the foldable cornerlock within the notch of the frame member and the body portions of the foldable cornerlock in an inserted position.
Figure 11A:
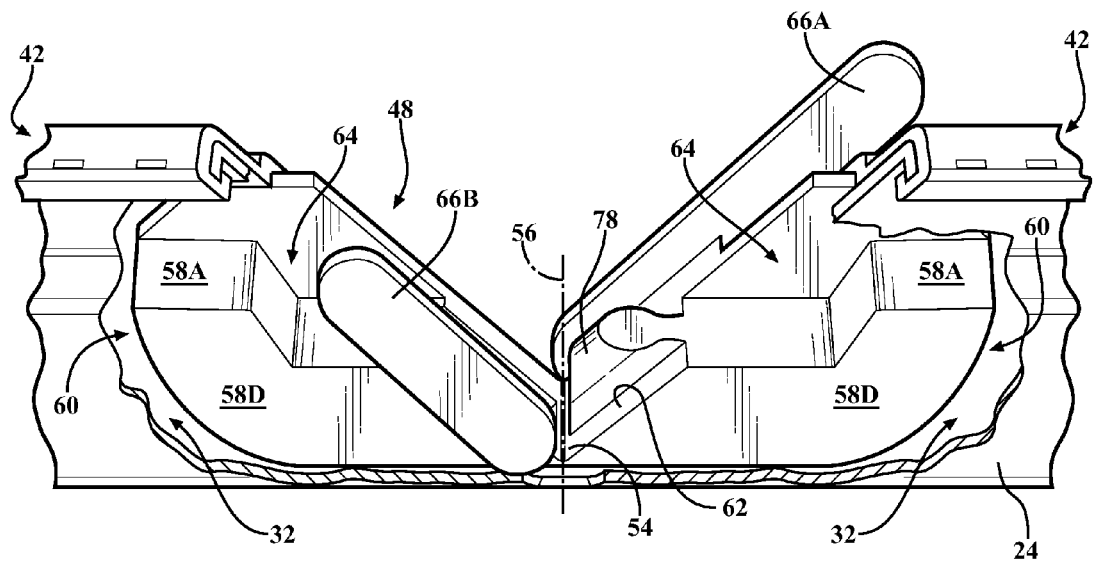
FIG. 11A is the perspective view of FIG. 11 with the frame member partial cut away to reveal the cornerlock within the interior of the frame member.
Figure 12:
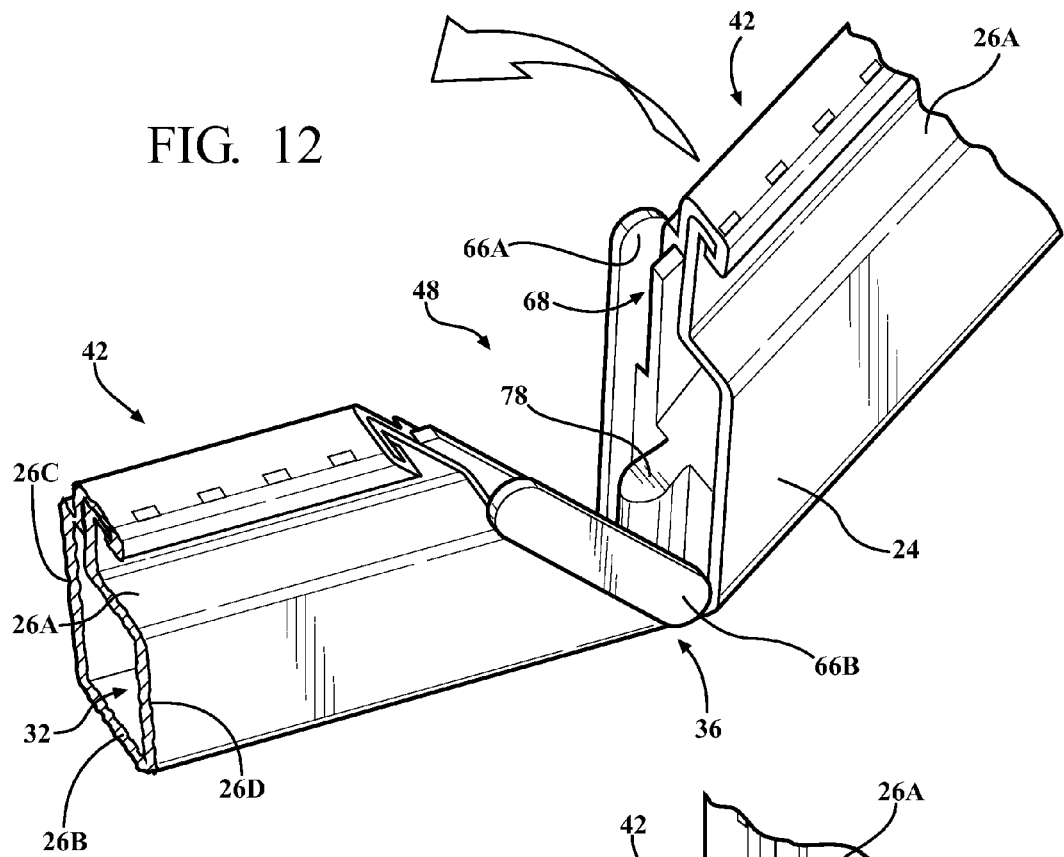
FIG. 12 is a perspective view of a portion of the frame member with the foldable cornerlock within the notch illustrating the frame member bending at the notch.

As shown in FIGS. 10 and 10A, when the body portions 50, 52 are in the pre-inserted position, the foldable cornerlock 48 is disposed within the notch 34A-34C and the body portions 50, 52 are planar with each other. More specifically, when the body portions 50, 52 are in the pre-inserted position, the bottom surface 26B of each of the body portions 50, 52 may be planar with each other. Additionally, when the body portions 50, 52 are in the pre-inserted position, the hinge portion 54 may contact the frame member 24 with the body portions 50, 52 extending into the interior 32 of the frame member 24.

As shown in FIG. 13, when the body portions 50, 52 are in the locked position, the body portions 50, 52 establish a right angle relative to each other. When the foldable cornerlock 48 is disposed within the notch 34A-34C and the body portions 50, 52 are in the locked position, the frame member 24 is completely bent to form the corner 36 of the frame member 24. When the body portions 50, 52 are in the locked position, the abutting surface 62 of each of the body portions 50, 52 may contact each other. It is to be appreciated that when the body portions 50, 52 are in the pre-inserted position or the inserted position, the interlocking portions 74 are spaced from each other but, when the body portions 50, 52 are in the locked position, the interlocking portions 74 engage each other. If present, the interlocking portions 74 retain the foldable cornerlock 48 in the locked position once the interlocking portions 74 engage each other. It is also to be appreciated that when the body portions 50, 52 are in the pre-inserted position or the inserted position, the arm members 66A, 66B may extend longitudinally in a non-parallel direction relative to each other but, when the body portions 50, 52 are in the locked position, the arm members 66A, 66B may extend longitudinally in a parallel direction relative to each other.

Generally, as the body portions 50, 52 move from the pre-inserted position to the inserted position, the body portions 50, 52 slide along the interior 32 of the frame member 24. The arcuate configuration of the ends 28, 30 facilitates the sliding of the body portions 50, 52 within the interior 32 of the frame member 24. If the hinge portion 54 is present, then the hinge portion 54 moves toward the bottom wall 26D of the frame member 24 as the body portions 50, 52 move from the pre-inserted position to the inserted position. As the body portions 50, 52 move from the inserted position to the locked position, the frame member 24 is bent at the notch 34A-34C to form the corner 36 of the frame member 24. If the interlocking portions 74 are present, then the interlocking portions 74 move toward each other as the body portions 50, 52 move from the inserted position to the locked position. If the abutting surfaces 62 are present, the abutting surfaces 62 move toward each other as the body portions 50, 52 move from the pre-inserted position toward the locked position.

The method may also comprise the steps of moving the body portions 50, 52 of the foldable cornerlock 48 into the pre-inserted position, the inserted position, and the locked position. It is to be appreciated that the steps of moving the body portions 50, 52 into the pre-inserted position, the inserted position, and the locked position may be independent from one another and each step is not required in the method. Said differently, the method may only move the body portions 50, 52 into one of the pre-inserted position, the inserted position, and the locked position.

The method may further comprise the step of applying a force F to the foldable cornerlock 48 to move the body portions 50, 52 from the pre-inserted position toward the inserted position. It is to be appreciated that the step of applying the force F to the foldable cornerlock 48 may be further defined as applying the force F to the hinge portion 54 of the foldable cornerlock 48 to move the body portions 50, 52 from the pre-inserted position toward the inserted position. Generally, the force is applied in a direction toward the bottom walls 26B of the frame member 224.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A frame assembly comprising:
    a frame member having a plurality of walls extending between a first end and a second end spaced from said first end, with said walls defining an interior of said frame member and also defining at least one notch spaced from said ends of said frame member wherein at least one of said plurality of walls is continuous between said ends of said frame member and is bendable at said notch to form a corner of said frame member;
    at least one foldable cornerlock comprising first and second body portions movable relative to each other for inserting said foldable cornerlock into said notch of said frame member with said foldable cornerlock further comprises at least one arm member spaced from one of said body portions thereby defining a gap between said one of said body portions and said arm member with at least one of said walls of said frame member disposed within said gap.

2. A frame assembly as set forth in claim 1 wherein said body portions move between a pre-inserted position where said body portions establish an acute angle relative to each other and a locked position where said body portions establish an right angle relative to each other.

3. A frame assembly as set forth in claim 1 wherein said foldable cornerlock further comprises a hinge portion coupling said body portions together and defining an axis extending in a longitudinal direction through said hinge portion, with said body portions movable relative to each other by rotation about said axis.

4. A frame assembly as set forth in claim 3 wherein each of said body portions have an end spaced from said hinge portion with said ends having an arcuate configuration for sliding along said interior of said frame member as said foldable cornerlock is inserted in said notch.

5. A frame assembly as set forth in claim 1 wherein said at least one arm member is further defined as a first arm member spaced from said first body portion thereby defining a first gap between said first body portion and said first arm member, and a second arm member spaced in said longitudinal direction from said second body portion thereby defining a second gap between said second body portion and said second arm member, with said first gap receiving one of said walls of said frame member and said second gap receiving another on of said walls of said frame member.

6. A frame assembly as set forth in claim 5 wherein each of said body portions of said foldable cornerlock have an exterior surface and an opposing interior surface with said first arm member spaced in said longitudinal direction from said exterior surface of said body portions and with said second arm member spaced in said longitudinal direction from said interior surface of said body portions for allowing the frame member to be disposed between said arm members with said arm members covering the walls of the frame member.

7. A frame assembly as set forth in claim 1 wherein said plurality of walls of said frame member are further defined as a top wall, a bottom wall spaced opposite from said top wall, an exterior wall interconnecting said top wall and said bottom wall, and an interior wall spaced opposite from said exterior wall and interconnecting said top wall and said bottom wall wherein said bottom wall is continuous over an entire length of said frame member and is bendable at said notch to form said corner of said frame member.

8. A frame assembly as set forth in claim 1 wherein said foldable cornerlock further comprises interlocking portions configured to engage each other for securing said body portions together to prevent said body portions from moving relative to each other once said interlocking portions engage each other.

9. A frame assembly as set forth in claim 8 wherein said interlocking portions comprise a female portion defined by said first body portion and a male portion extending from said second body portion configured to mate with said female portion to prevent said body portions from separating once said interlocking portions engage each other.

10. A frame assembly as set forth in claim 1 further comprising a fenestration article coupled to said frame member.

11. A frame assembly as set forth in claim 10 further comprising a flange extending from said frame member for securing said fenestration article to said frame member.

12. A frame assembly as set forth in claim 1 further comprising a coupling cornerlock disposed in each of the ends of the frame member for coupling said ends of said frame member together.

13. A frame assembly as set forth in claim 1 wherein said at least one notch is further defined as a first notch, a second notch, and a third notch defined in said walls with each of said notches spaced from each other and from said ends of said frame member, and said at least one foldable cornerlock is further defined as a first foldable cornerlock, a second foldable cornerlock, and a third foldable cornerlock disposed in said first, second, and third notches, respectively.

14. A method of forming a frame assembly for supporting an article, the frame assembly comprising a frame member having a plurality of walls extending between a first end and a second end which is spaced from the first end, with the walls defining an interior of the frame member and also defining at least one notch spaced from the ends of the frame member wherein at least one of the plurality of walls is continuous between the ends of the frame member, and at least one foldable cornerlock having first and second body portions movable relative to each other with at least one arm member spaced from one of the body portions thereby defining a gap between one of the body portions and the arm member, said method comprising the steps of:
    forming the at least one notch in the frame member spaced from the ends of the frame member;
    inserting the foldable cornerlock into the notch such that the body portions of the foldable cornerlock extend into the interior of the frame member;
    bending the at least one of the plurality of walls that is continuous between the ends of the frame member at the notch to define a corner of the frame member;
    disposing at least one of the walls of the frame member within the gap defined between the at least one arm member and one of the body portions.

15. A method as set forth in claim 14 further comprising the step of moving the body portions of the foldable cornerlock into a pre-inserted position such that the body portions establish an acute angle relative to each other.

16. A method as set forth in claim 15 wherein the step of inserting the foldable cornerlock is further defined as positioning the foldable cornerlock within the notch with the body portions in the pre-inserted position.

17. A method as set forth in claim 15 further comprising the step of applying a force to the foldable cornerlock to move the body portions from the pre-inserted position toward an inserted position such that the body portions are planar relative to each other and the body portions slide along the frame member in the interior of the frame member.

18. A method as set forth in claim 17 further comprising the step of moving the body portions of the foldable cornerlock from the inserted position toward a locked position where the body portions establish a right angle relative to each other as the frame member is bent about the notch of the frame member.

19. A method as set forth in claim 18 wherein the foldable cornerlock has interlocking portions configured to engage each other and said method further comprises the step of forcing the interlocking portions of the foldable cornerlock together to retain the foldable cornerlock in the locked position.

20. A method as set forth in claim 14 wherein the foldable cornerlock further has a hinge portion coupling the body portions together and defining an axis extending in a longitudinal direction through the hinge portion and said method further includes the step of rotating the body portions into a pre-inserted position such that the body portions establish an acute angle relative to each other.

21. A method as set forth in claim 14 further comprising the step of coupling the ends of the frame member together with a coupling cornerlock.

22. A method as set forth in claim 14 wherein the article is further defined as a fenestration article and said method further comprises the step of attaching the fenestration article to the frame member.

23. A method as set forth in claim 14 wherein the step of forming at least one notch in the frame member is further defined as forming a first notch, a second notch, and a third notch in the frame member with each of the notches spaced from each other and from the ends of the frame member.

24. A method as set forth in claim 23 wherein the at least one foldable cornerlock is further defined as a first foldable cornerlock, a second foldable cornerlock, and a third foldable cornerlock and the step of inserting the foldable cornerlock into the notch is further defined as inserting the first foldable cornerlock, the second foldable cornerlock, and the third foldable cornerlock into the first notch, the second notch, and the third notch, respectively, such that the body portions of each of the foldable cornerlocks extend into the interior of the frame member.

25. A method as set forth in claim 24 wherein the step of bending the frame member about the hinge portion of the foldable cornerlock is further defined as bending the frame member about the hinge portion of each of the first cornerlock within the first notch, the second cornerlock within the second notch, and the third cornerlock within the third notch to present the frame assembly with a rectangular configuration.

* * * * *